United States Patent
Ting et al.

(10) Patent No.: US 11,454,339 B2
(45) Date of Patent: Sep. 27, 2022

(54) QUICK-LOCKING UNION CONNECTOR

(71) Applicant: TOP GREAT PNEUMATIC MACHINERY CO., LTD., Taichung (TW)

(72) Inventors: Chieh-Yao Ting, Taichung (TW); Shang-Chieh Ting, Taichung (TW)

(73) Assignee: TOP GREAT PNEUMATIC MACHINERY CO., LTD., Taichung (TW)

( * ) Notice: Subject to any disclaimer, the term of this patent is extended or adjusted under 35 U.S.C. 154(b) by 218 days.

(21) Appl. No.: 16/906,728

(22) Filed: Jun. 19, 2020

(65) Prior Publication Data

US 2020/0400256 A1 Dec. 24, 2020

(30) Foreign Application Priority Data

Jun. 21, 2019 (TW) ................................ 108121747

(51) Int. Cl.
*F16L 21/08* (2006.01)
*F16L 21/035* (2006.01)

(52) U.S. Cl.
CPC ............. *F16L 21/08* (2013.01); *F16L 21/035* (2013.01)

(58) Field of Classification Search
CPC ......... F16L 21/08; F16L 21/035; F16L 37/12; F16L 37/14; F16L 37/142; F16L 37/146; F16L 37/18; F16L 37/20

USPC ................................... 285/91, 312, 394, 403
See application file for complete search history.

(56) References Cited

U.S. PATENT DOCUMENTS 4,701,074 A * 10/1987 Hall ...................... F16L 37/146
403/324

FOREIGN PATENT DOCUMENTS

TW 493702 U 7/2002
TW M562913 U 7/2018

* cited by examiner

*Primary Examiner* — Aaron M Dunwoody
(74) *Attorney, Agent, or Firm* — Muncy, Geissler, Olds & Lowe, P.C.

(57) ABSTRACT

The invention provides a quick-locking union connector. A sealing groove is arranged on the outside peripheral surface of a male inner sleeve to retain an o-ring seal. Close contact of the o-ring seal with the inside peripheral surface of a female outer sleeve leads to a robust sealing effect. The female outer sleeve is provided with a bore slot that penetrates through the inside peripheral surface, in an outside-to-inside manner. A locking unit rotates within the bore slot to quickly lock and unlock the engaged interior male unit and exterior female unit. Locked connection of pipes via obstructing protrusion of the locking unit into an annular locking groove can be readily and quickly executed, facilitating accelerated deployment of pipe networks.

9 Claims, 7 Drawing Sheets

QUICK-LOCKING UNION CONNECTOR

FIELD OF THE INVENTION

The invention relates to a quick-locking union connector for connecting different pipes.

BACKGROUND OF THE INVENTION

Generally, the compressed air is produced by utilizing an air compressor or pump to pressurize air. In addition to driving pneumatic tools or equipments, the compressed air can be widely applied in various fields, such as dust removal, drying, and bottle blow molding. Conventionally, a pipe union is employed in order to facilitate the work of piping and plumbing. A pipe union unites two pipes or pipelines. Installation and partial replacement of compressed-air pipe networks usually requires the utilization of a pipe union.

As shown in Taiwan Patent No. M562913 or No. 493702, connection of pipes is executed via various rotating methods. In industrial plants or manufacturing factories, the compressed-air pipe networks are mostly deployed at locations nearby the ceiling. Utilizing conventional pipe unions for piping work at height usually causes unfavorable leaking problems associated with the pipe union. It is not unusual that the mating threads of the pipe union are tightened inappropriately due to incautious engaging-deviation, which could cause the leakage. Poor sealing caused by the pipe union is particularly troublesome. Moreover, it is unallowable for threaded pipe unions to undertake further rotation after being tightened, because leakage could occur more readily. To modify or adjust the pipe angular orientation, forcible bending action is required, by which the pipe could be subjected to additional bending stress. This bending stress, however, could incur accelerated fracture of the sealing components, leading to leakage as well. In these aspects, a conventional pipe union could largely decelerate pipe connection and is inconveniently risky for work at height.

SUMMARY OF THE INVENTION

The main purpose of the invention is to provide a quick-locking union connector capable of rapidly implementing lockable engagement and disengagement, which substantially facilitates accelerated deployment of pipe networks.

On the basis of this purpose, the present invention discloses a union connector that is quickly lockable for connecting a first pipe with a second pipe. This union connector comprises an interior male unit, an exterior female unit, and at least one locking unit. One end of the interior male unit is configured to have a male connection portion that is connected to the first pipe. The opposite end of the interior male unit is configured to have a male inner sleeve that comprises an outside peripheral surface. An annular locking groove and at least one sealing groove are formed circumferentially on the outside peripheral surface. The annular locking groove is adjacent to the male connection portion, whereas the sealing groove, installed with an o-ring seal, is more distant to the male connection portion.

The exterior female unit is used for engaging the interior male unit. One end of the exterior female unit is configured to have a female connection portion attached to the second pipe. The opposite end of the exterior female unit is configured to have a female outer sleeve that comprises an inside peripheral surface. Specifically, there is at least one bore slot that penetrates through the female outer sleeve, in an outside-to-inside manner. When the interior male unit and exterior female unit are brought into engagement with each other, the inside peripheral surface of the female outer sleeve corresponds spatially to the outside peripheral surface of the male inner sleeve. The inside peripheral surface of the female outer sleeve is in close contact with the o-ring seal, and the bore slot is situated in a position coincided with the annular locking groove on the interior male unit being engaged.

The locking unit of the union connector is devised such that it configurationally comprises a rod body, a non-circular head, and an elastic fastener member. The rod body of the locking unit is coaxially inserted into and fittingly engaged with the bore slot of the exterior female unit. The rod body has a notched configuration consisting of a solid portion and a concave notch. Furthermore, the rod body can rotate relative to the bore slot, which is further classifiable into two distinct positions; that is, a first rotational position and a second rotational position. As to the first rotational position, the solid portion of the rod body protrudes fittingly into the space occupied by the annular locking groove of the male inner sleeve; accordingly, the exterior female unit and the interior male unit are solidly interlocked, obstructing any mutual displacement and disengagement. In contrast, as to the second rotational position, the rod body is rotated to the opposite angular position in which the obstructing protrusion of the rod body no longer exists. The concave notch, in this second position, encompasses the annular locking groove, and the engaged male inner sleeve can be withdrawn freely from the female outer sleeve.

The non-circular head and the elastic fastener member are respectively arranged at the opposite ends of the rod body. A slotted recess is formed at the end associated with the elastic fastener member, which allows a driving tool to be applied to rotate the rod body. A user can rotate the rod body via the driving tool either to the first rotational position or to the second rotational position.

The rod body is able to slide longitudinally within the bore slot of the female outer sleeve, resulting in respectively a first state and a second state for the non-circular head. When situated in the first state, which is rotatable, the non-circular head is not in contact with the female outer sleeve, so that the rod body has a rotational degree of freedom. When situated in the second state, which is non-rotatable, the non-circular head is brought into contact interference with the female outer sleeve, annihilating the rotational degree of freedom of the rod body. Moreover, in the second state, the elastic fastener member mechanically presses against the female outer sleeve, so that the non-circular head is stabilized in the second state. To switch back to the first state, a driving tool is required to apply to the slotted recess, annihilating the contact interference of the non-circular head with the female outer sleeve; accordingly, the rod body becomes rotatable.

DETAILED DESCRIPTION OF THE PREFERRED EMBODIMENTS

Figure 1:
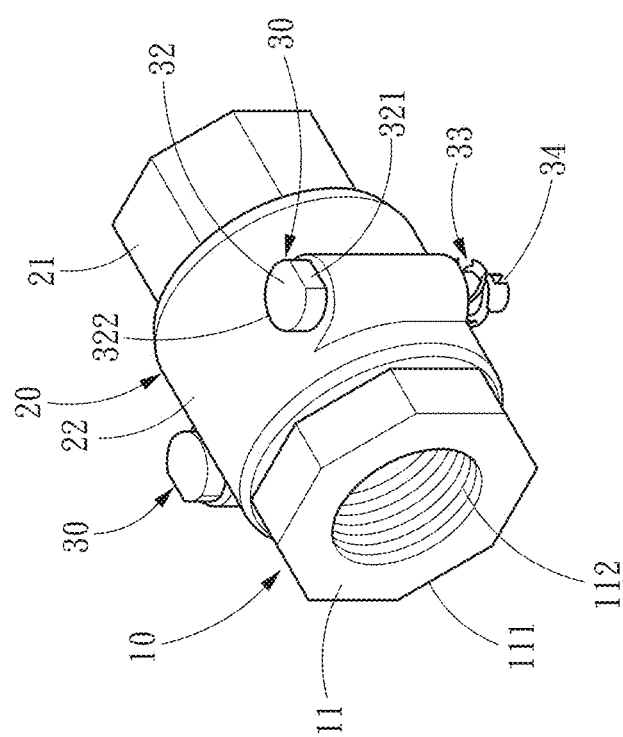
FIG. 1 is a perspective structural view of the present invention.
Figure 2:
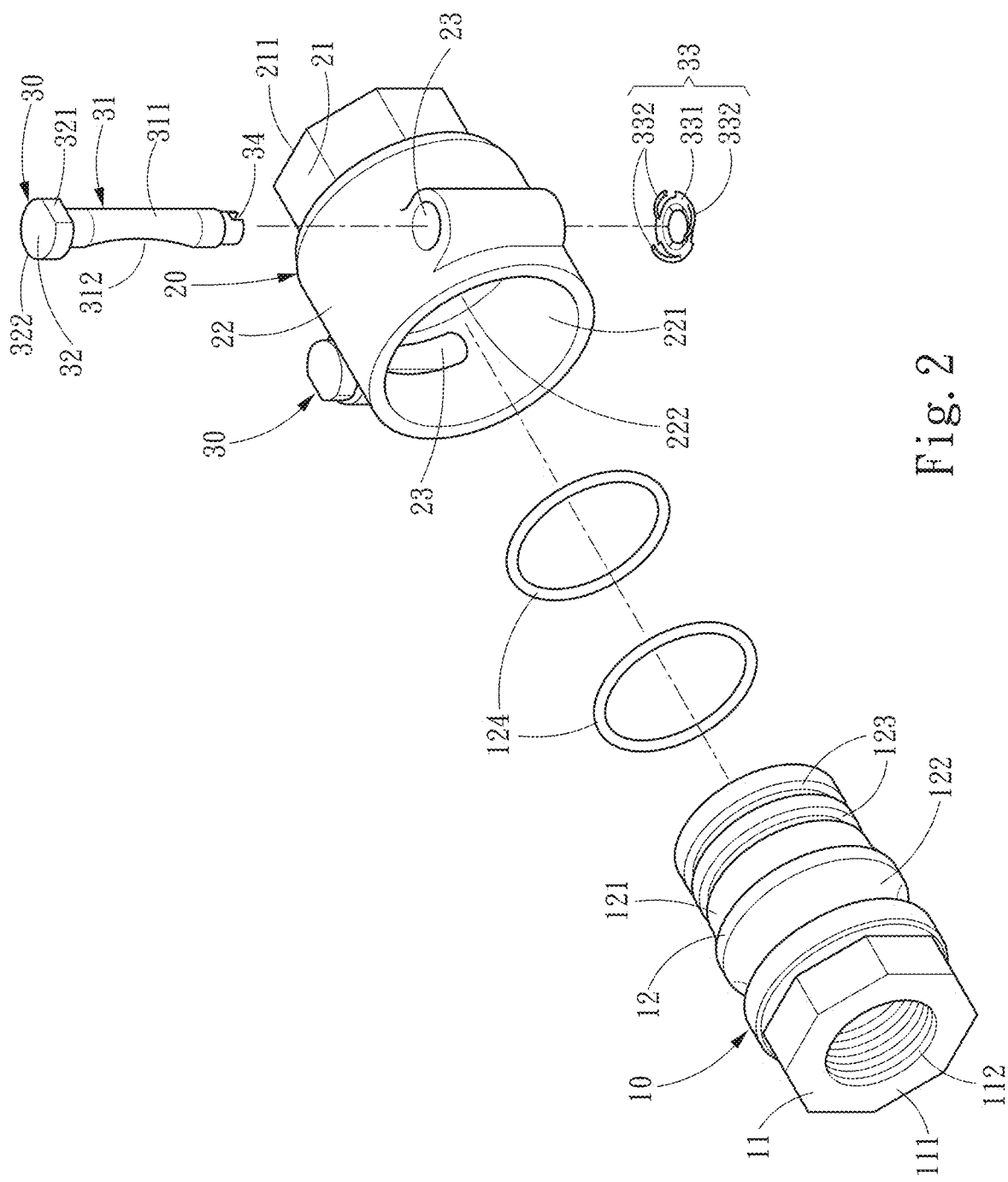
FIG. 2 is an exploded structural view of the present invention.
Figure 3:
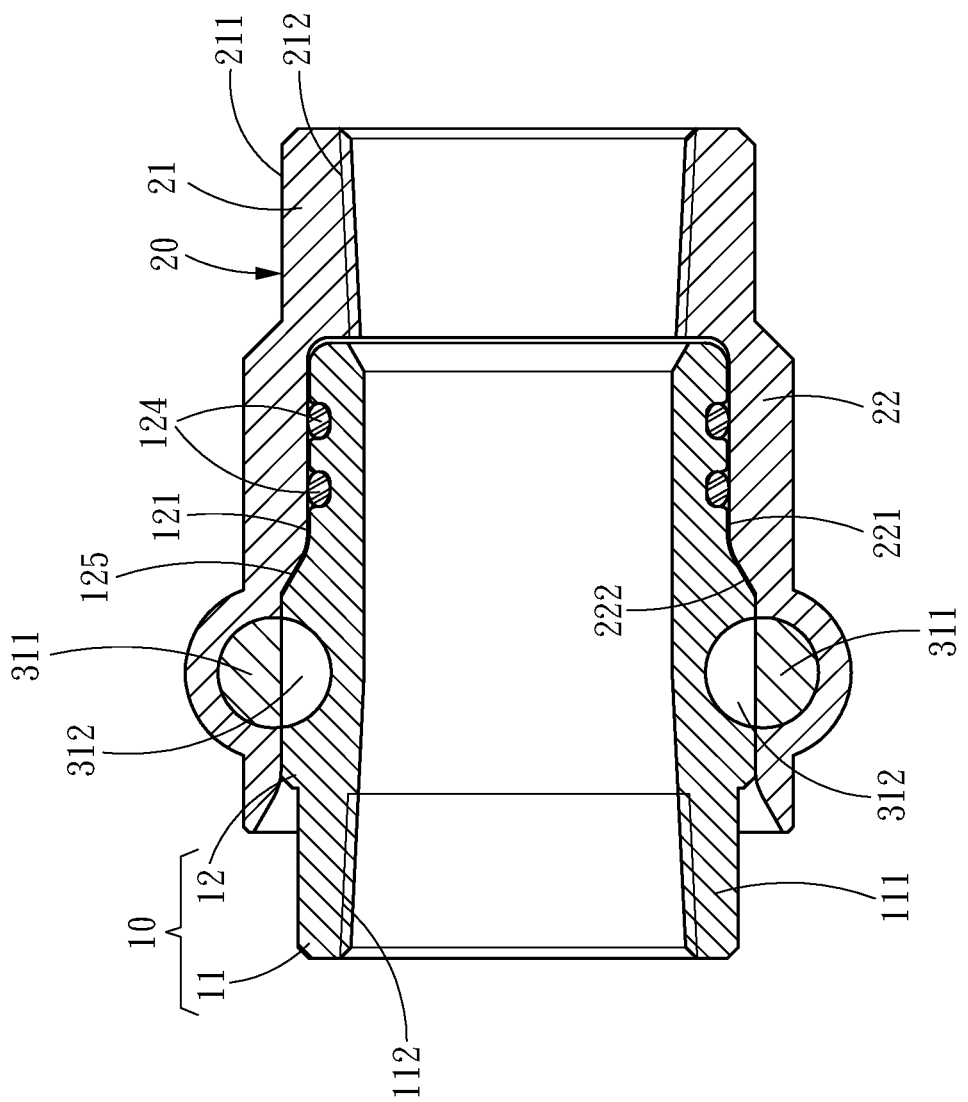
FIG. 3 is a combined sectional view of the present invention.

The detailed description and technical contents of the present invention will now be described with reference to the drawings as follows:

With reference to FIG. 1, FIG. 2, and FIG. 3, the present invention is a quick-locking union connector for connecting a first pipe (not shown) with a second pipe (not shown). The quick-locking union connector comprises an interior male unit 10, an exterior female unit 20, and at least one locking unit 30. One end of the interior male unit 10 is configured to have a male connection portion 11. The male connection portion 11 comprises a first octagonal nut 111 and a first interior screw-thread 112 connecting to the first pipe. The other end of the interior male unit 10 is configured to have a male inner sleeve 12 that exhibits an outside peripheral surface 121. The outside peripheral surface 121 is configured to have an annular locking groove 122 and at least one sealing groove 123. The annular locking groove 122 is adjacent to the male connection portion 11, and the sealing groove 123, installed with the o-ring seal 124, is more distant to the male connection portion 11. Preferably, the number of the at least one sealing groove 123 is two.

One end of the exterior female unit 20 is configured to have a female connection portion 21. The female connection portion 21 is formed with a second octagonal nut 211 and a second interior screw-thread 212 to be connected to the second pipe. The other end of the exterior female unit 20 is configured to have a female outer sleeve 22 that exhibits an inside peripheral surface 221. The inside peripheral surface 221 comprises an inner oblique chamfer-surface 222 which restricts the extent that the male inner sleeve 12 penetrates into the female outer sleeve 22. The outside peripheral surface 121 comprises an outer oblique chamfer-surface 125 corresponding to the inner oblique chamfer-surface 222. The female outer sleeve 22 consists of at least one bore slot 23. Preferably, the number of the at least one bore slot 23 is two, and two slots 23 are positioned symmetrically on the female outer sleeve 22. The at least one bore slot 23 penetrates through the inside peripheral surface 221, from outside to inside of the body of the female outer sleeve.

To engage the exterior female unit 20 with the interior male unit 10 (as shown in FIG. 3), the male inner sleeve 12 is inserted into the female outer sleeve 22, and the inside peripheral surface 221 spatially corresponds to the outside peripheral surface 121. The inside peripheral surface 221 is in close contact with the o-ring seal 124, enabling a favorable gas-tight sealing effect. In addition, the outside peripheral surface 121 can fittingly abut against the adjoining edge of the female connection portion 21, so that there does not exist any abrupt steps or sharp edges in the flow area. This results in an improved fluid-passage flatness that is beneficial for reducing the flow pressure-drop associated with the connector.

The position of the at least one bore slot 23 spatially corresponds to that of the annular locking groove 122. The at least one locking unit 30 comprises respectively a rod body 31, a non-circular head 32, and an elastic fastener member 33. At least one rod body 31 is fittingly inserted into the bore slot 23. The rod body 31 is configured to have a solid portion 311 and a concave notch 312. The rod body 31 can rotate relative to the bore slot 23, resulting in a first rotational position and a second rotational position. As to the rod body 31 being in the first rotational position, the solid portion 311 protrudes into the annular locking groove 122. Accordingly, when the male inner sleeve 12 is inserted into the female outer sleeve 22, with the rod body 31 being in the first rotational position, the male inner sleeve 12 is locked and incapable of being withdrawn from the female outer sleeve 22.

When the rod body 31 is in the second rotational position, the concave notch 312 completely encompasses the annular locking groove 122 (as shown in FIG. 3). Preferably, the contour curvature of the concave notch 312 is greater than that of the corresponding inside peripheral surface 221, so that the rod body 31 (solid portion 311) no longer obstructs the male inner sleeve 12, and the male inner sleeve 12 can be withdrawn from the female outer sleeve 22.

The non-circular head 32 and the elastic fastener member 33 are respectively arranged at the opposite ends of the rod body 31. The rod body 31 is provided with a slotted recess 34 at the end associated with the elastic fastener member 33. The rod body 31 can slide relative to the bore slot 23, which allows the non-circular head 32 to have a first state and a second state. As to the first state, the non-circular head 32 does not contact the exterior female unit 20, so that the rod body 31 has a rotational degree of freedom. As to the second state, the non-circular head 32 is brought into contact interference with the exterior female unit 20, so that the rod body 31 is obstructed and does not have a rotational degree of freedom. In addition, the elastic fastener member 33 exerts a force pressing against the exterior female unit 20, thus the non-circular head 32 is stabilized in the second state and subjected to an obstructive force capable of preventing loosened movements.

The non-circular head 32 is specifically configured to have a straight edge 321 together with a curved edge 322 that is adjoining to the straight edge 321. When the rod body 31 is in the first rotational position, the straight edge 321 is aligned to contact the exterior female unit 20. When the rod body 31 is in the second rotational position, alternatively, the curved edge 322 contacts the exterior female unit 20. One can readily determine whether or not the rod body 31 is in the first rotational position by observing and examining the occurrence of contact of the straight edge 321 with the exterior female unit 20. When the non-circular head 32 is in the second state, the straight edge 321 can be obstructed by the exterior female unit 20 and become non-rotatable. The rod body 31 is thus kept at the first rotational position; stable engagement of the male inner sleeve 12 with the female outer sleeve 22 can be ensured, rendering improved safety for connection.

Preferably, the elastic fastener member 33 comprises an annulus 331 clamped securely to the rod body 31 and a plurality of elastic fingers 332 extending outward from the annulus 331. The annulus 331 and the elastic fingers 332 integrally form the structure of the elastic fastener member 33, with the elastic fingers 332 being pressing against the edge of the bore slot 23.

Figure 4A:
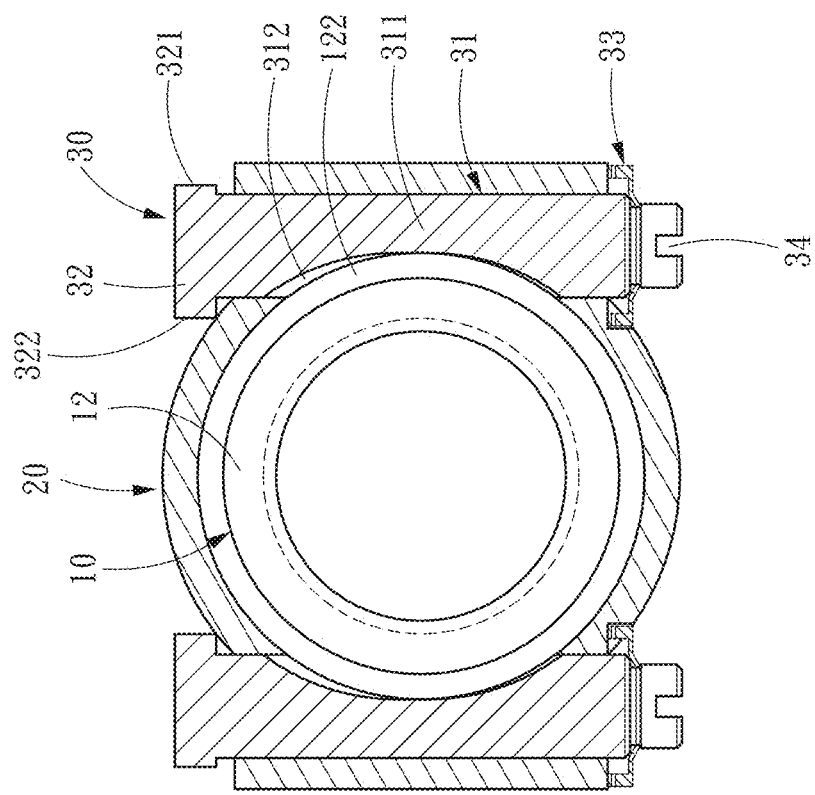
FIGS. 4A-4C are cross-sectional views illustrating continuous engaging movements of the present invention.
Figure 4B:
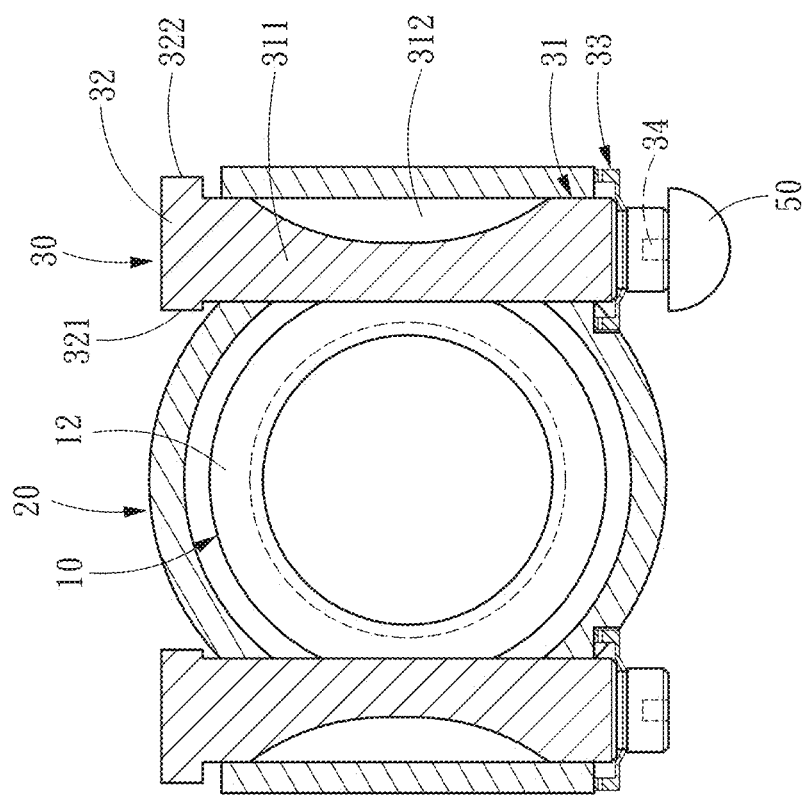
Figure 4C:
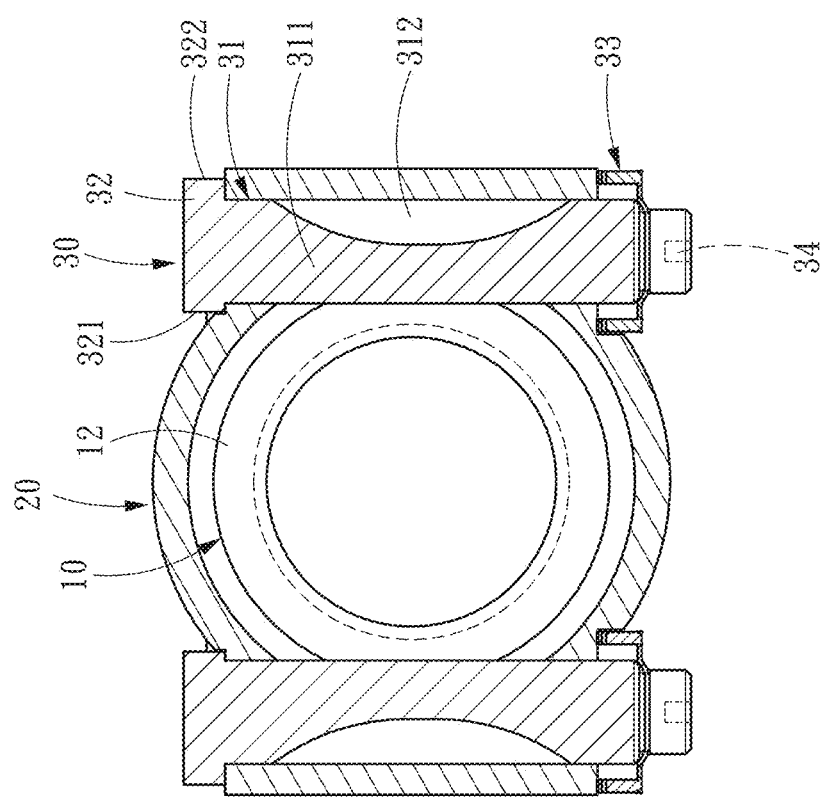

Please refer to FIG. 4A, FIG. 4B and FIG. 4C, which are cross-sectional views to illustrate continuous engaging movements associated with the present invention. Firstly, as shown in FIG. 4A, the rod body 31 is in the second rotational position and the non-circular head 32 is in the second state. In such a situation, the concave notch 312 completely encompasses the annular locking groove 122 (i.e. the solid portion 311 does not protrude into the annular locking groove 122). The male inner sleeve 12 thus can be readily inserted into the female outer sleeve 22, reaching to a position (as shown in FIG. 3) without being obstructed by the solid portion 311.

Secondly, as shown in FIG. 4B, a driving tool 50 is applied to the slotted recess 34 to rotate the rod body 31, which enables a user to rotate the rod body 31 to the first rotational position where the male inner sleeve 12 is obstructed and cannot be withdrawn from the female outer sleeve 22. It is unnecessary to compress the elastic fastener member 33 while rotating the locking unit 30 (the rod body 31) with the driving tool 50 in that the elastic fastener member 33 is able to keep on pushing the locking unit 30 (the rod body 31) downwards, which directly leads to the state depicted in FIG. 4C. As to the state depicted in FIG. 4B, the driving tool 50 is applied to compress the elastic fastener member 33, so that, without being moving downwards, the non-circular head 32 is retained in the first state. Finally, as shown in FIG. 4C, the driving tool 50 is removed from the slotted recess 34. The elastic fastener member 33, consequently, is able to press against the exterior female unit 20. This results in sliding movement of the locking unit 30 and enables the non-circular head 32 to switch from the first state to the second state. The non-circular head 32, in the second state, is obstructed by the exterior female unit 20, and thus the locking unit 30 is not rotatable. This renders a remarkably robust locking effect, ensuring that the male inner sleeve 12 is unable to be withdrawn from the female outer sleeve 22.

As to the unlocking (disengagement) operation, a user just needs to perform the aforementioned procedures in the reverse order. At first, the elastic fastener member 33 is compressed by the driving tool 50, and then the non-circular head 32 is switched to the first state (as shown in FIG. 4B). In this first state, the non-circular head 32 is not obstructed by the exterior female unit 20. The locking unit 30 (the rod body 31) can be rotated readily to a position in which the concave notch 312 completely encompasses the annular locking groove 122, as depicted in FIG. 4A. That is, the solid portion 311 does not protrude into the annular locking groove 122, and accordingly the male inner sleeve 12 is able to be withdrawn from the female outer sleeve 22.

It is worth to note that when the straight edge 321 of the non-circular head 32 contacts the exterior female unit 20, the driving tool 50 should be applied first to compress the elastic fastener member 33, so that the straight edge 321 of the non-circular head 32 no longer contacts the exterior female unit 20 and enables rotation of the rod body 31. On the other hand, when the curved edge 322 of the non-circular head 32 is in contact with the exterior female unit 20, the rod body 31 can be rotatable without having the driving tool 50 to compress the elastic fastener member 33, and thereby operational convenience is enhanced.

Figure 5:
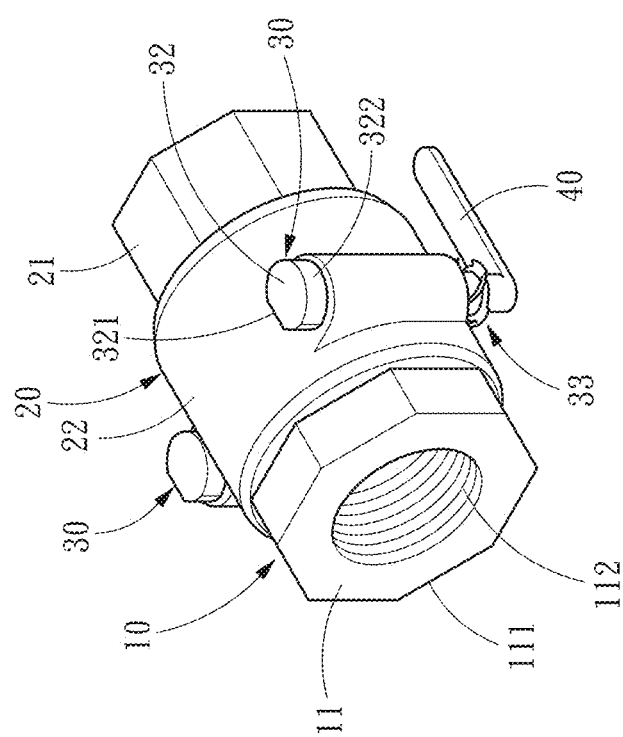
FIG. 5 is a perspective structural view of another embodiment of the present invention.

Furthermore, as shown in FIG. 5, a grip 40 can be utilized to conveniently manipulate the locking unit 30. Without using a driving tool 50, the grip 40 can assist in rotating the locking unit 30, which is particularly useful for applications that pertain to the work at height.

As described above, the present invention includes at least the following advantages.

1. Gas-tight sealing structure is formed via installation of the o-ring seal arranged between the outside peripheral surface and the inside peripheral surface, which effectively resolves the poor sealing problem associated with the conventional pipe union.

2. Lockable engagement of the interior male unit with the exterior female unit is carried out in a quick manner of rotating the locking unit (the rod body). The rod body is either in the first rotational position or in the second rotational position. When the solid portion of the rod body protrudes into the annular locking groove, the male inner sleeve is obstructed, and disengagement of the interior male unit from the exterior female unit is prohibited. When the concave notch completely encompasses the annular locking groove (i.e. the solid portion does not protrude into the annular locking groove), the rod body no longer obstructs the male inner sleeve, and the interior male unit and exterior female unit can be readily disengaged. This invention beneficially meets the needs of quick connection and disconnection, particularly useful for work at height.

3. The non-circular head is able to stabilize in the second state (i.e. non-rotatable) through the arrangement of the non-circular head in conjunction with the elastic fastener member. The non-circular head becomes non-rotatable when brought into contact interference with the exterior female unit, and a locking structure can be stably formed, with improved safety for connection.

4. The inside peripheral surface comprises an inner oblique chamfer-surface which restricts the extent that the male inner sleeve penetrates into the female outer sleeve. The outside peripheral surface can fittingly abut against the adjoining edge of the female connection portion, so that there does not exist any abrupt steps or sharp edges in the flow area, rendering an improved fluid-passage flatness that is beneficial for reducing the flow pressure-drop associated with the connector.

5. The annulus and the plurality of elastic fingers of the elastic fastener member are devised as an integral structure, which exhibits combined advantages of a washer, a spring, and a baffle.

6. When the rod body is in the first rotational position, the straight edge of the non-circular head is aligned to contact the exterior female unit. One can readily determine whether the rod body is in the first rotational position just by observing and examining the occurrence of contact of the straight edge with the exterior female unit.

What is claimed is:

1. A quick-locking union connector for connecting a first pipe with a second pipe, comprising:
an interior male unit, one end of the interior male unit configured to have a male connection portion that is connected to the first pipe, the opposite end of the interior male unit configured to have a male inner sleeve, the male inner sleeve comprising a outside peripheral surface, wherein an annular locking groove and at least one sealing groove are formed circumferentially on the outside peripheral surface, the annular locking groove is adjacent to the male connection portion, and the sealing groove, installed with an o-ring seal, is distant to the male connection portion;
an exterior female unit engaging the interior male unit, one end of the exterior female unit configured to have a female connection portion that is attached to the second pipe, the opposite end of the exterior female unit configured to have a female outer sleeve that comprises an inside peripheral surface, and at least one bore slot penetrating through the female outer sleeve in an outside-to-inside manner, wherein when the interior male unit and exterior female unit are brought into engagement with each other, the inside peripheral surface of the female outer sleeve corresponds spatially to the outside peripheral surface of the male inner sleeve, and the inside peripheral surface of the female outer sleeve is in close contact with the o-ring seal, and the bore slot is situated in a position coincided with the annular locking groove on the interior male unit being engaged; and at least one locking unit, each locking unit comprising a rod body, a non-circular head and an elastic fastener member, the rod body coaxially inserted into and fittingly engaged with the bore slot of the exterior female unit, and the rod body comprises a notched configuration including a solid portion and a concave notch, wherein the rod body rotates relative to the bore slot to have a first rotational position that the solid portion of the rod body protrudes fittingly into a space occupied by the annular locking groove of the male inner sleeve, and a second rotational position that the concave notch encompasses the annular locking groove, the non-circular head and the elastic fastener member respectively arranged at two ends of the rod body, and a slotted recess formed at the end associated with the elastic fastener member, wherein the rod body slides longitudinally within the bore slot of the female outer sleeve to allow the non-circular head to have a first state that the non-circular head is not in contact with the female outer sleeve, and a second state that the non-circular head is brought into contact interference with the female outer sleeve; and wherein the non-circular head comprises a straight edge and a curved edge adjoining to the straight edge, the straight edge is aligned to contact the exterior female unit when the rod body is in the first rotational position, and the curved edge contacts the exterior female unit when the rod body is in the second rotational position.

2. The quick-locking union connector of claim 1, wherein the male connection portion comprises a first octagonal nut and a first interior screw-thread connecting to the first pipe, and the female connection portion comprises a second octagonal nut and a second interior screw-thread connecting to the second pipe.

3. The quick-locking union connector of claim 1, wherein the locking unit comprises a grip to facilitate rotating the locking unit.

4. The quick-locking union connector of claim 1, wherein a number of the at least one sealing groove is two.

5. The quick-locking union connector of claim 1, wherein a number of the at least one bore slot is two, and the two bore slots are positioned symmetrically on the exterior female unit.

6. The quick-locking union connector of claim 1, wherein the inside peripheral surface comprises an inner oblique chamfer-surface that restricts an extent that the male inner sleeve penetrates into the female outer sleeve, and the outside peripheral surface comprises an outer oblique chamfer-surface that corresponds to the inner oblique chamfer-surface.

7. The quick-locking union connector of claim 1, wherein the outside peripheral surface fittingly abuts an edge of the female connection portion.

8. The quick-locking union connector of claim 1, wherein a contour curvature of the concave notch is greater than a contour curvature of the inside peripheral surface.

9. The quick-locking union connector of claim 1, wherein the elastic fastener member comprises an annulus clamped securely to the rod body and a plurality of elastic fingers integrally formed with the annulus, and the plurality of elastic fingers are pressed against the bore slot.

* * * * *